United States Patent
Miwa et al.

(10) Patent No.: US 8,226,898 B2
(45) Date of Patent: Jul. 24, 2012

(54) HONEYCOMB STRUCTURE AND EXHAUST GAS TREATMENT APPARATUS

(75) Inventors: Yuki Miwa, Gifu (JP); Akihito Nishi, Gifu (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 517 days.

(21) Appl. No.: 12/245,821

(22) Filed: Oct. 6, 2008

(65) Prior Publication Data
US 2009/0246096 A1    Oct. 1, 2009

(30) Foreign Application Priority Data
Mar. 27, 2008    (WO) .................. PCT/JP2008/055972

(51) Int. Cl.
*B01D 50/00*    (2006.01)
(52) U.S. Cl. ......................................... 422/180
(58) Field of Classification Search .................. 422/177, 422/180
See application file for complete search history.

(56) References Cited

U.S. PATENT DOCUMENTS

| | | |
|---|---|---|
| 2001/0026838 A1 | 10/2001 | Dettling et al. |
| 2003/0224933 A1 | 12/2003 | Kondo et al. |
| 2005/0266992 A1 | 12/2005 | Ohno et al. |
| 2006/0008396 A1 | 1/2006 | Wursthorn et al. |
| 2006/0096276 A1 * | 5/2006 | Goralski et al. ................ 60/286 |
| 2006/0100098 A1 * | 5/2006 | Ura et al. ...................... 502/325 |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| | | |
|---|---|---|
| JP | 09-085091 | 3/1997 |
| JP | 2001207836 A * | 8/2001 |
| JP | 2001-252565 | 9/2001 |
| JP | 2003-154223 | 5/2003 |
| JP | 2006-075724 | 3/2006 |
| JP | 2007-313477 | 12/2007 |
| WO | 01/74476 | 10/2001 |
| WO | WO 2005/063653 | 7/2005 |

* cited by examiner

*Primary Examiner* — Tom Duong
(74) *Attorney, Agent, or Firm* — Ditthavong Mori & Steiner, P.C.

(57) ABSTRACT

A honeycomb structure includes at least one honeycomb unit having a first end face and a second end face opposite to the first end face along a longitudinal direction of the at least one honeycomb unit. The at least one honeycomb unit includes an inorganic particle, an inorganic binder, cell walls extending along the longitudinal direction from the first end face to the second end face to define a plurality of cells, a NOx storage catalyst provided at the cell walls, and a noble metal catalyst provided at the cell walls. An amount of the noble metal catalyst provided at a vicinity of the first end face is substantially different from an amount of the noble metal catalyst provided at a vicinity of the second end face.

35 Claims, 6 Drawing Sheets

HONEYCOMB STRUCTURE AND EXHAUST GAS TREATMENT APPARATUS

CROSS-REFERENCE TO RELATED APPLICATION

The present application claims priority under 35 U.S.C §119 to International Application No. PCT/JP2008/055972, filed Mar. 27, 2008, the entire contents of which are incorporated herein by reference.

BACKGROUND OF THE INVENTION

1. Field of the Invention

The present invention relates to a honeycomb structure and an exhaust gas treatment apparatus.

2. Description of the Related Art

Conventionally, honeycomb structures are employed in exhaust gas treatment apparatuses used for treating NOx and the like in exhaust gases of automobiles (e.g. WO2005/063653A1).

Basic framework parts such as cell walls of a honeycomb structure are made of alumina, for instance. On the cell walls, a noble metal catalyst such as platinum, for example, and a NOx storage catalyst including an alkali metal salt, an alkaline earth metal salt or the like, are supported. Generally, in the case where the exhaust gas is an oxidizing atmosphere (for example, during normal operation of a diesel engine), the noble metal catalyst plays a role in oxidizing NOx (such as NO and $NO_2$) in the exhaust gas to $NO_3$ when the exhaust gas passes into the honeycomb structure. On the other hand, the NOx storage catalyst temporarily adsorbs $NO_3$ produced in this oxidation reaction. $NO_3$ adsorbed by the NOx storage catalyst is, when the exhaust gas is switched to a reducing atmosphere (for example, during rich spike control of the diesel engine), reduced to $N_2$ via the noble metal catalyst and then discharged out of the honeycomb structure system.

Accordingly, NOx in the exhaust gases of an automobile can be treated by passing the exhaust gases into a honeycomb structure having such a configuration.

The contents of WO2005/063653A1 are incorporated herein by reference.

SUMMARY OF THE INVENTION

According to one aspect of the present invention, a honeycomb structure includes at least one honeycomb unit having a first end face and a second end face opposite to the first end face along a longitudinal direction of the at least one honeycomb unit. The at least one honeycomb unit includes an inorganic particle, an inorganic binder, cell walls extending along the longitudinal direction from the first end face to the second end face to define a plurality of cells, a NOx storage catalyst provided at the cell walls, and a noble metal catalyst provided at the cell walls. An amount of the noble metal catalyst provided at a vicinity of the first end face is substantially different from an amount of the noble metal catalyst provided at a vicinity of the second end face.

According to another aspect of the present invention, an exhaust gas treatment apparatus to treat NOx included in exhaust gases includes a honeycomb structure. The honeycomb structure includes at least one honeycomb unit having an upstream end face and a downstream end face opposite to the upstream end face along a longitudinal direction of the at least one honeycomb unit. The honeycomb structure is provided so that the exhaust gases flow from the upstream end face to the downstream end face. The at least one honeycomb unit includes an inorganic particle, an inorganic binder, cell walls extending along the longitudinal direction from the upstream end face to the downstream end face to define a plurality of cells, a NOx storage catalyst provided at the cell walls, and a noble metal catalyst provided at the cell walls. An amount of the noble metal catalyst provided at a vicinity of the upstream end face is larger than an amount of the noble metal catalyst provided at a vicinity of the downstream end face.

DETAILED DESCRIPTION OF THE PREFERRED EMBODIMENTS

The following describes preferred embodiments of the present invention in reference to the drawings.

Figure 1:
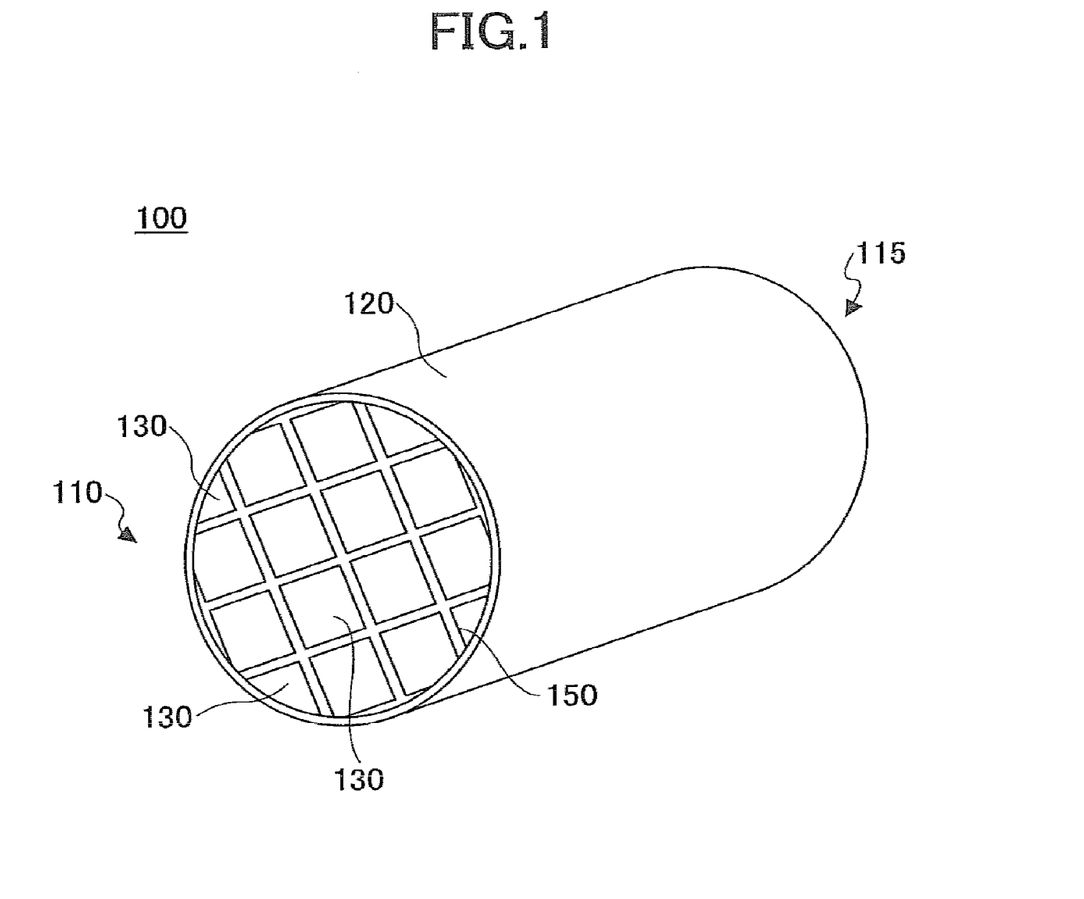
FIG. 1 is a perspective view schematically showing one example of a honeycomb structure of an embodiment of the present invention.
Figure 2:
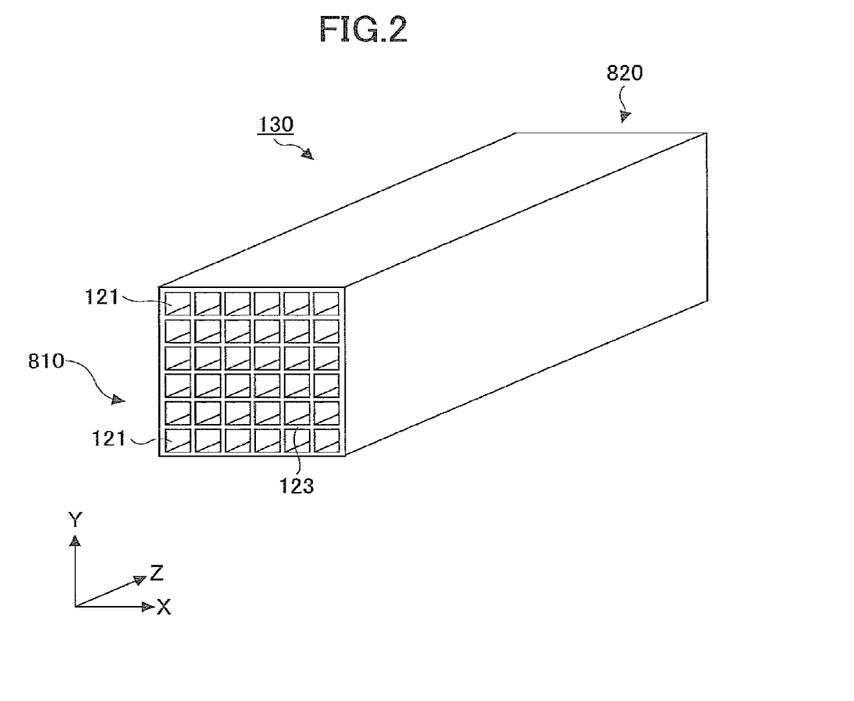
FIG. 2 is a perspective view schematically showing an example of a honeycomb unit constituting the honeycomb structure of FIG. 1.

FIG. 1 schematically shows one example of a honeycomb structure of an embodiment of the present invention. FIG. 2 schematically shows an example of a honeycomb unit which is a basic unit of the honeycomb structure of FIG. 1.

As shown in FIG. 1, a honeycomb structure 100 of the embodiment of the present invention has two open faces (a first end face 110 and a second end face 115). A coat layer 120 is provided on the peripheral surface of the honeycomb structure 100, except on the end faces.

The honeycomb structure 100 is formed by, for example, joining plural pillar ceramic honeycomb units (one of which is shown in FIG. 2 as a honeycomb unit 130) by interposing an adhesive layer 150 (the example of FIG. 1 shows 16 honeycomb units arranged in four rows of four columns) and then applying a cutting process on the peripheral side of the joined honeycomb units to form the honeycomb structure into a predetermined shape (cylindrical in the example of FIG. 1).

As shown in FIG. 2, the honeycomb unit 130 extends from one end to the other end along its longitudinal direction, and has plural cells (through holes) 121 open at both end faces and cell walls 123 separating these cells (note that the other end cannot be seen from the view of the figure and is therefore not shown). On the cell walls 123, a catalyst (not shown) comprising a noble metal, such as platinum, and a NOx storage material (not shown) including an alkali metal and/or an alkaline earth metal are supported.

When the honeycomb structure 100 formed by joining honeycomb units, each of which is a honeycomb unit 130 having such a configuration, is disposed in the exhaust gas line of a diesel engine, for example, and then the exhaust gases passes through the honeycomb structure 100, the following phenomena are observed.

During a lean-burn operation (normal operation of a diesel engine), the exhaust gases flowing into each cell 121 of the honeycomb unit 130 from an end face (e.g. the end face 110) of the honeycomb structure 100 come in contact with the noble metal catalyst supported on the cell walls 123 when passing through the cell. Herewith, by the effect of the noble metal catalyst, NO gas included in the exhaust gases is reacted as follows:

$$2NO+O_2 \rightarrow 2NO_2 \qquad \text{Formula (1)}.$$

$NO_2$ produced by the reaction is adsorbed by the NOx storage catalyst adjacent to the noble metal catalyst by the following reaction:

$$2NO_2+Ba+O_2 \rightarrow Ba(NO_3)_2 \qquad \text{Formula (2-1)};$$

$$2NO_2+2K+O_2 \rightarrow 2KNO_3 \qquad \text{Formula (2-2)}.$$

Subsequently, the exhaust gases whose NOx has been treated reach the other end of the cell 121, and are then discharged from the other end face (e.g. the end face 115) of the honeycomb structure 100.

On the other hand, when the engine is switched to rich spike control, NOx adsorbed by the NOx storage catalyst during the lean-burn operation is reduced in the following reaction:

$$4HC+2CO+6NO_2 \rightarrow 3N_2+6CO_2+2H_2O \qquad \text{Formula (3)}.$$

The reduced $N_2$ is subsequently discharged from the other end face (e.g. the end face 115) of the honeycomb structure 100.

Thus, with the honeycomb structure 100, NOx included in the exhaust gases is treated by the operation of the noble metal catalyst and NOx storage catalyst supported on the cell walls of the honeycomb structure 100.

As to conventional honeycomb structures, the noble metal catalyst for activating the above-mentioned oxidation-reduction reaction is, in effect, uniformly supported on the cell walls in both the depth direction from the surface of each cell wall and the extending direction of each cell. Also in the present day usual case, excessive amounts of noble metal catalyst are generally supported on honeycomb structures in order to conduct the NOx treatment in a reliable fashion.

However, it is believed that the all noble metal catalyst supported on a honeycomb structure is not used in the reaction of treating NOx in the exhaust gases. That is to say, in practice, when the exhaust gases pass into the honeycomb structure, it often seems the case that only a certain part of the noble metal catalyst supported on the cell walls of the honeycomb structure does most of the reaction of treating NOx in the exhaust gases. This certain part distance from one end of the honeycomb structure (on the gas inflow side) to a position shifted, to some extent, from the end toward the downstream side of the exhaust gas passage. On the other hand, it would appear that the noble metal catalyst supported on the cell walls near the other end (on the gas discharge side) is little involved in the NOx treatment reaction.

What the above indicates is that, in an actual exhaust gas treatment where a honeycomb structure is used, the NOx treatment may possibly not be performed to a sufficient degree that would be reasonably expected according to the amount of noble metal catalyst supported on the honeycomb structure. In fact, it has often been observed that the efficiency of the NOx treatment by a honeycomb structure supported a noble metal catalyst turns out to be lower than expected.

Also, in the usual case, a costly material, such as platinum, is used as the noble metal catalyst of the honeycomb structure. Accordingly, such an inefficient use of the noble metal catalyst is a problem on the cost side.

One embodiment of the present invention may be a honeycomb structure requiring a smaller amount of noble metal catalyst supported thereon when compared to a conventional honeycomb structure having the same treatment performance as the honeycomb structure according to the embodiment of the present invention. Also, another embodiment of the present invention may be a honeycomb structure having higher NOx treatment performance when compared to a conventional honeycomb structure having the same amount of noble metal catalyst as the honeycomb structure according to the embodiment of the present invention.

In a conventional honeycomb structure, the noble metal catalyst is, in effect, uniformly supported in the thickness directions (see X direction and Y direction of FIG. 2) of respective cell walls as well as in the extending direction (see Z direction of FIG. 2) of the cells.

Figure 3:
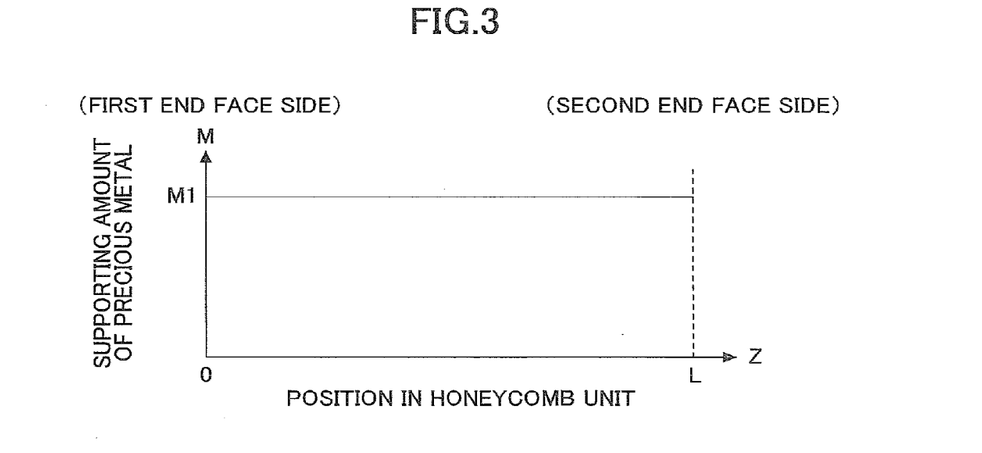
FIG. 3 relates to a conventional honeycomb structure, and schematically shows a relationship between distance from a first end face side and catalyst supporting amount.

FIG. 3 schematically shows changes in the supporting amount of noble metal catalyst in the longitudinal direction of a conventional honeycomb unit. In FIG. 3, the horizontal axis Z represents a position from the first end face of the honeycomb unit, and the vertical axis M represents the amount of noble metal catalyst supported on the cell walls. L is the entire length of the honeycomb unit. Accordingly, a position where Z=L corresponds to the second end face of the honeycomb unit.

As shown in FIG. 3, in the case of a conventional honeycomb structure, the noble metal catalyst is uniformly supported over the entire length L of the honeycomb unit, from the first end face side to the second end face side.

In the usual case (where a larger amount of noble metal catalyst is used), the exhaust gases flow into each cell from the first end face of the honeycomb unit, pass inside the honeycomb structure in the longitudinal direction, and are then discharged from the second end face side of the honeycomb unit. However, when the noble metal catalyst is supported in the aforementioned conventional manner, it is believed difficult to make effective and uniform use of the noble metal catalyst supported at different regions of the cell walls across the entire length of the honeycomb unit. This is because NOx included in the exhaust gases flowing in the honeycomb unit from the first end face is largely treated at a region close to the first end face side, and NOx concentration in the exhaust gases has already been significantly reduced when the exhaust gases reach close to the second end face side. What this means is that, for the reduced NOx concentration in the exhaust gases, an excessive amount of noble metal catalyst is supported at a region near the second end face side.

Also the above-mentioned problem regarding the conventional honeycomb structure indicates that, in an actual exhaust gas treatment using the honeycomb structure, the NOx treatment may possibly not be performed to a sufficient degree that would be reasonably expected according to the amount of noble metal catalyst supported on the honeycomb structure. In fact, it has often been observed that the efficiency of the NOx treatment by a honeycomb structure supporting a noble metal catalyst turns out to be lower than expected.

Furthermore, in the usual case, a costly material, such as platinum, is used as the noble metal catalyst of the honeycomb structure. Accordingly, such an inefficient use of the noble metal catalyst is a problem on the cost side.

Figure 4:
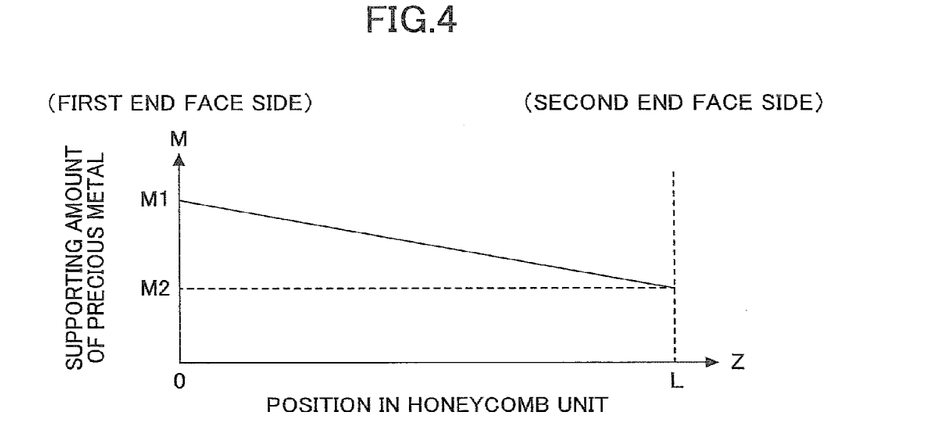
FIG. 4 relates to the honeycomb structure of an embodiment of the present invention, and schematically shows a relationship between distance from a first end face side and catalyst supporting amount.

On the other hand, in the case of the honeycomb structure 100 of the embodiment of the present invention, the supporting amount of noble metal catalyst changes over the entire length of the honeycomb unit 130, as shown in FIG. 4. That is, an amount of noble metal catalyst M1 at the first end face side is larger than an amount of noble metal catalyst M2 at the second end face side.

Such changes in the supporting amount of noble metal catalyst over the entire length of the honeycomb unit 130 is likely to allow the honeycomb structure 100 of the embodiment of the present invention to make more effective use of the noble metal catalyst in the NOx treatment, as compared to a conventional honeycomb structure. This is because, in the embodiment of the present invention, the amount of noble metal catalyst supported in the region at and near the second end face side is reduced, where the noble metal catalyst is conventionally used less effectively in the treatment reaction. That is, according to the embodiment of the present invention, the amount of noble metal catalyst is adjusted over the entire length of the honeycomb unit 130 so that almost all the noble metal catalyst is equally used in the treatment reaction.

Therefore, according to the embodiment of the present invention, in the case where substantially the same amount of noble metal catalyst as used in a conventional honeycomb structure is supported on the honeycomb structure 100, it is possible to improve the NOx treatment efficiency. On the other hand, in the case where the treatment efficiency of the embodiment of the present invention is kept substantially the same as in the case of a conventional honeycomb structure, the embodiment of the present invention is likely to be able to significantly reduce the supporting amount of noble metal catalyst.

Note that, in the aforementioned example (FIG. 4), the supporting amount of noble metal catalyst M continuously (more specifically, "linearly") changes—declining from the value (M1) on the side of the first end face 810 of the honeycomb unit 130 to the value (M2) on the side of the second end face 820. However, the embodiment of the present invention is not limited to this case.

Figure 5:
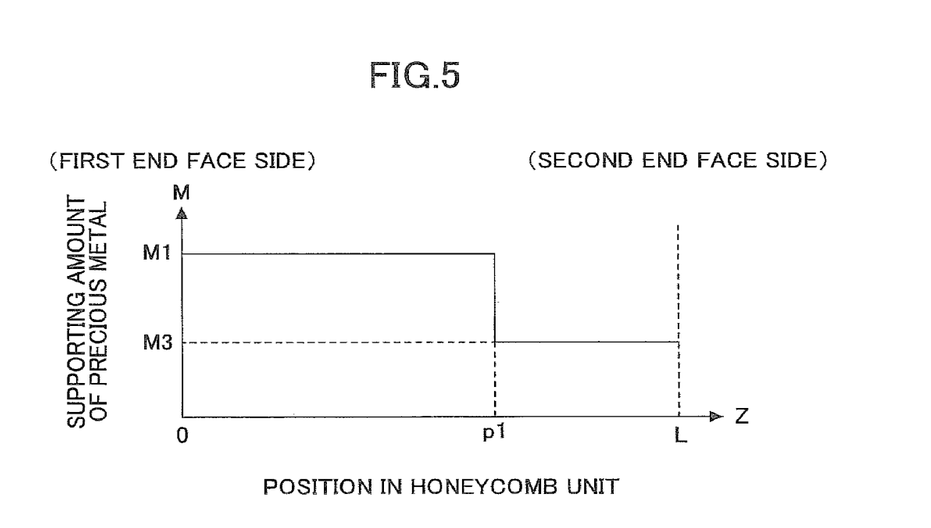
FIG. 5 relates to the honeycomb structure of an embodiment of the present invention, and schematically shows another relationship between distance from the first end face side and the catalyst supporting amount.
Figure 6:
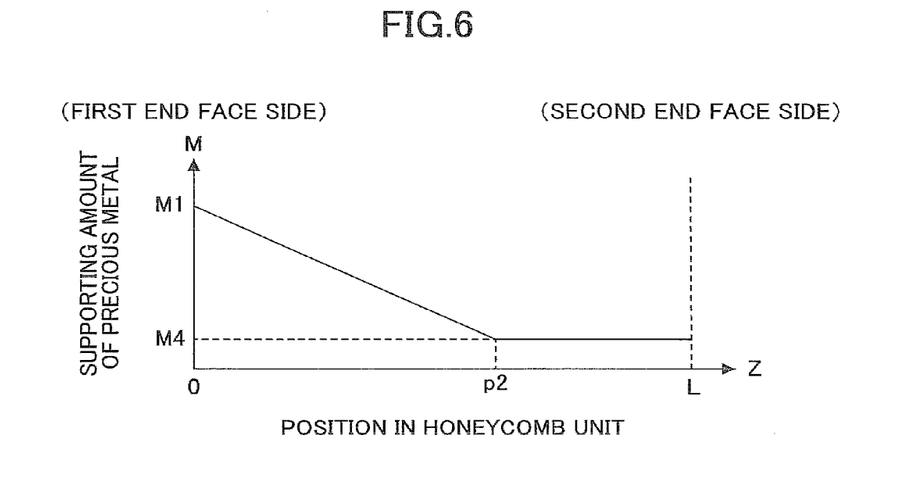
FIG. 6 relates to the honeycomb structure of an embodiment of the present invention, and schematically shows yet another relationship between distance from the first end face side and the catalyst supporting amount.

FIGS. 5 and 6 show other examples applicable to the embodiment of the present invention, where the supporting amount of noble metal catalyst changes over the entire length of the honeycomb unit 130.

In the example of FIG. 5, the amount of noble metal catalyst is M1 in a region ranging from the first end face side of the honeycomb unit 130 to a position shifted a distance p1 from the first end face, and the amount of noble metal catalyst is M3 (M1>M3) in the remaining region.

In the example of FIG. 6, the amount of noble metal catalyst gradually declines from M1 to M4 in a region ranging from the first end face of the honeycomb unit to a position shifted a distance p2 from the first end face, and the amount of noble metal catalyst is constant at M4 (M1>M4) in the remaining region.

When the supporting amount of noble metal catalyst changes over the entire length of the honeycomb unit 130 in these manners, it is also possible to realize the aforementioned effect of the embodiment of the present invention.

Note that, in the cases of FIGS. 5 and 6, the values of the positions p1 and p2 may basically take any values, provided they satisfy 0<p1<L and 0<p2<L.

In FIG. 4, the slope of the straight line S (i.e. (M1−M2)/L) may take any value.

Although not shown in FIGS. 5 and 6, the amount of noble metal catalyst may decrease in a stepwise fashion with plural steps, from the first end face side toward the second end face side. Furthermore, the continuous changes in the amount of noble metal catalyst, for example as shown in the region 0<Z<p2 of FIGS. 4 and 6, are not necessarily linear, and the amount of noble metal catalyst may decrease in a nonlinear manner.

That is, the important point of the embodiment of the present invention is that the noble metal catalyst is supported on the cell walls in such a manner that the amount of noble metal catalyst at and near the first end face side of the honeycomb unit is larger than at and near the second end face side. And as long as this condition is satisfied, the embodiment of the present invention allows any manner of changes in the amount of noble metal catalyst in the longitudinal direction of the honeycomb unit 130.

Specifically speaking, the supporting amount of noble metal catalyst at a position about 10 mm away from the first end face is preferably about two to about seven times larger than at a position about 10 mm away from the second end face. If the supporting amount on the first end face side is about twice or more that on the second end face side, it is less likely to require a larger amount of catalyst, unlike in the conventional case. On the other hand, if the supporting amount on the first end face side is about seven times or less, the catalyst amount is less likely to fall short, which is less likely to lead to an insufficient NOx treatment.

Note that the supporting amount of noble metal catalyst can be obtained by an ICP emission spectrometer (for instance, by elemental analyses using an ICPS-8100 (Shimadzu)).

The honeycomb unit 130 includes inorganic particles and inorganic binder, and additionally may include inorganic fibers.

The inorganic particles are preferably made of particles of alumina, silica, zirconia, titania, ceria, mullite, zeolite and the like. One kind selected from these particles may solely be used as the inorganic particles, or two or more kinds may be used together. More specifically, of them, alumina and ceria are particularly desirable.

For the inorganic binder, inorganic sol, clay binders and the like may be used. Specific examples of such inorganic sol are alumina sol, silica sol, titania sol, liquid glass and the like. Specific examples of the clay binders are clays of double-chain structure, such as white earth, kaolin, montmorillonite, sepiolite and attapulgite. One kind selected from these clays may solely be used, or two or more kinds may be used together.

Among the above-mentioned inorganic materials, it is preferable to use at least one selected from the group consisting of alumina sol, silica sol, titania sol, liquid glass, sepiolite and attapulgite.

In the case when inorganic fibers are added to the honeycomb unit 130, a desirable material of such inorganic fibers is alumina, silica, silicon carbide, silica-alumina, glass, potassium titanate, aluminum borate or the like. One kind selected from them may solely be used, or two or more kinds may be used together. Among them, alumina is preferable.

As to the amount of the inorganic particles included in the honeycomb unit 130, a lower limit is preferably about 30 wt %, more preferably about 40 wt %, and further preferably about 50 wt %. On the other hand, an upper limit is preferably about 90 wt %, more preferably about 80 wt %, and further preferably about 75 wt %. When the content of the inorganic particles is about 30 wt % or more, the amount of inorganic particles contributing to the gas conversion is less likely to be relatively reduced. On the other hand, when the content is about 90 wt % or less, the strength of the honeycomb unit is less likely to be reduced.

As to the amount of the inorganic binder included in the honeycomb unit, a lower limit is preferably about 5 wt % or more as solids content, more preferably about 10 wt % or more, and further preferably about 15 wt % or more. On the other hand, an upper limit is preferably about 50 wt % or less as solids content, more preferably about 40 wt % or less, and further preferably about 35 wt % or less. When the content of the inorganic binder is about 5 wt % or more as solids content, the strength of the manufactured honeycomb unit is less likely to be reduced. On the other hand, when the content is about 50 wt % or less as a solids content, the molding processability of the raw material composition is less likely to be reduced.

In the case when inorganic fibers are included in the honeycomb unit, a lower limit of the total amount of the inorganic fibers is preferably about 3 wt %, more preferably about 5 wt %, and further preferably about 8 wt %. On the other hand, an upper limit is preferably about 50 wt %, more preferably about 40 wt %, and further preferably about 30 wt %. When the content of the inorganic fibers is about 3 wt % or more, the contribution of the inorganic fibers to improving the strength of the honeycomb unit is less likely to be diminished, and when the content is about 50 wt % or less, the amount of inorganic particles contributing to the gas conversion is less likely to be relatively reduced.

Regarding the honeycomb unit 130, the shape of a cross section cut perpendicular to the longitudinal direction is not particularly limited, and it may take any shape, provided honeycomb units 130 can be joined by interposing an adhesive layer. The shape of the honeycomb unit 130 cross section may be square, rectangular, hexagonal, fan-shaped or the like.

In addition, the shape of a cross section of the cell 121 cut perpendicular to the longitudinal direction is also not particularly limited. Therefore, the shape is not limited to square, and may be triangular or polygonal, for example.

The cell density of the honeycomb unit 130 preferably ranges from about 15.5 cells/cm$^2$ to about 186 cells/cm$^2$ (about 100 cpsi to about 1200 cpsi), more preferably ranging from about 46.5 cells/cm$^2$ to about 170 cells/cm$^2$ (about 300 cpsi to about 1100 cpsi), and further preferably ranging from about 62.0 cells/cm$^2$ to about 155 cells/cm$^2$ (about 400 cpsi to about 1000 cpsi).

The thickness of the cell wall 123 of the honeycomb unit 130 is not particularly limited, yet a preferable lower limit is about 0.1 mm in view of the strength and a preferable upper limit is about 0.4 mm in view of the conversion performance.

As has been already mentioned, on the cell walls of the honeycomb unit 130, a noble metal catalyst and a NOx storage catalyst are supported. For the noble metal catalyst, no specific limitation is placed on the kind of noble metal, and platinum, palladium, rhodium or the like may be used, for example. The NOx storage catalyst includes an alkali metal such as potassium or sodium, and an alkaline earth metal such as barium, calcium or magnesium.

The honeycomb structure 100 of the embodiment of the present invention may take any shape. For example, besides a cylindrical shape as shown in FIG. 1, the honeycomb structure 100 may be cylindroid, square pillar, polygonal pillar or the like, for example.

As to the coat layer 120 of the honeycomb structure 100, its raw material is a paste including organic binders in addition to inorganic particles, inorganic binders and inorganic fibers. For the organic binders, polyvinyl alcohol, methylcellulose, ethyl cellulose, carboxylmethylcellulose, or the like may be used. One kind selected from them may solely be used, or a mixture of two or more kinds may be used instead. Among these organic binders, carboxylmethylcellulose is preferable.

Subsequently, the coat layer paste is applied on the outer peripheral surface of the honeycomb structure 100, and then dried and solidified to form a coat layer 120. Pore-forming agents, such as spherical acrylic particles, graphite, and balloons which are hollow microspheres comprising oxide base ceramic, may be added to the raw material paste if needed. The thickness of the coat layer 120 is preferably about 0.1 mm to about 2.0 mm.

In the honeycomb structure 100 of the embodiment of the present invention, the same material for the coat layer 120 is used for the adhesive layers 150. Note however that a different material from that of the coat layer 120 may be used for the adhesive layers 150.

The above description is given of an example of the honeycomb structure 100 formed by joining plural honeycomb units 130 by interposing the adhesive layers 150, like one shown in FIG. 1.

Figure 7:
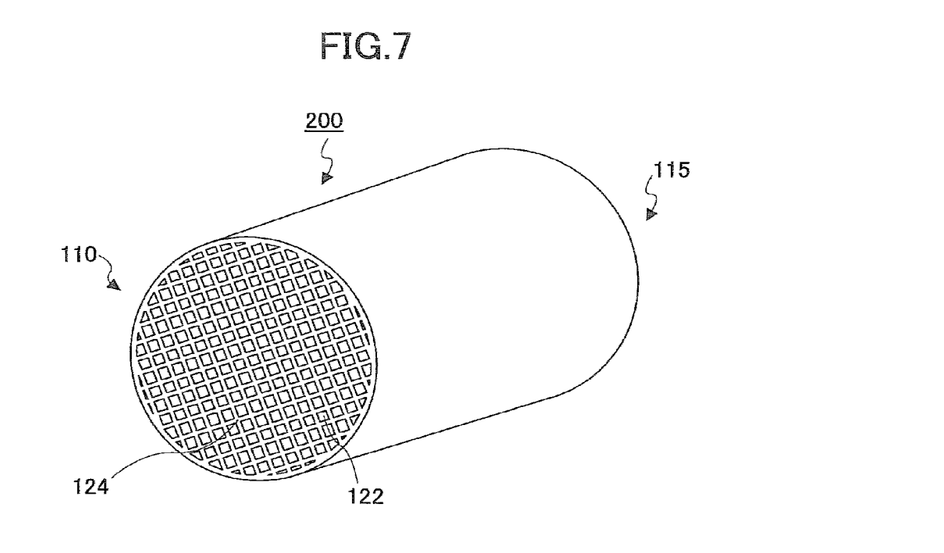
FIG. 7 is a perspective view schematically showing another example of the honeycomb structure of an embodiment of the present invention.

FIG. 7 shows another example of a honeycomb structure of an embodiment of the present invention. A honeycomb structure 200 is the same as the honeycomb structure 100, except that the honeycomb structure 200 is formed of a single honeycomb unit in which plural cells 122 are arranged parallel to each other in the longitudinal direction, separated by cell walls 124. Note that a coat layer may or may not be provided on the outer peripheral surface of the honeycomb structure 200.

These honeycomb structures 100 and 200 are applicable to apparatuses for treating the exhaust gases emitted from diesel engines, for example. In such a case, the honeycomb structure is used while being disposed in a manner that its end face side having a larger amount of catalyst supported on the cell walls faces a side from which the exhaust gases are introduced.

[Method of Manufacturing Honeycomb Structure]

Next is described a method of manufacturing the honeycomb structure of an embodiment of the present invention. Here, the description is given with an example of a method of manufacturing the foregoing honeycomb structure 100 comprising plural honeycomb units.

First, a honeycomb unit body is made by, for example, extrusion molding using a raw material paste that consists primarily of inorganic particles and inorganic binder and may also include inorganic fibers which may be added on an as-needed basis.

In addition to these inorganic materials, organic binder, dispersion media and shaping aids may be added to the raw material paste according to the formability of the raw material paste. The kinds of the organic binder are not particularly limited, and examples of such are one or more kinds of organic binders selected from methylcellulose, carboxylmethylcellulose, hydroxylethylcellulose, polyethylene glycol, phenolic resin, epoxy resin and the like. The relative quantity of the organic binders to be blended is preferably about 1 wt % to about 10 wt % when the total of the inorganic particles, inorganic binders and inorganic fibers is 100 wt %.

The kinds of the dispersion media are not particularly limited, and examples of such are water, organic solvents (e.g. benzene), and alcohols (e.g. methanol). The kinds of the shaping aids are not particularly limited, and examples of such are ethylene glycols, dextrins, fatty acids, fatty acid soaps and polyalcohols.

The raw material paste is not particularly limited, but is preferably mixed and kneaded. For instance, the paste may be mixed using a mixer, attriter or the like, or may be sufficiently kneaded by a kneader or the like. The method of forming and shaping the raw material paste is not particularly limited; however, it is preferable to form a shape having cells by, for example, extrusion molding or the like.

Next, the resultant molded body is preferably dried. A drying apparatus used to dry the molded body is not particularly limited, and examples of such are a microwave drying apparatus, a hot air drying apparatus, a dielectric drying apparatus, a reduced-pressure drying apparatus, a vacuum drying apparatus and a freeze drying apparatus. Also, the resultant molded body is preferably degreased. Degreasing conditions are not particularly limited and should be appropriately determined according to the kinds and amounts of organic substances included in the molded body; however, the molded body is degreased preferably at about 400° C. for about two hours. Furthermore, the resultant molded body is preferably fired. Firing conditions are not particularly limited; however, the molded body is fired preferably at about 600° C. to about 1200° C., and more preferably at about 600° C. to about 1000° C. This is because, if the firing temperature is about 600° C. or more, sintering is likely to be progressed, which is less likely to lead to a reduction in the strength of the honeycomb unit 130. On the other hand, if the firing temperature is about 1200° C. or less, sintering is less likely to be excessively progressed, which is less likely to lead to a decrease in the specific surface area of the honeycomb unit 130 per unit volume.

Next, a noble metal catalyst is supported on the cell walls of the resultant honeycomb unit 130. The noble metal catalyst is supported on the cell walls preferably by a so-called "impregnation process" in which the honeycomb unit 130 is immersed in an impregnation solution including noble metal. As has been described, according to the embodiment of the present invention, the noble metal catalyst needs to be supported on the cell walls in such a manner that the amount of noble metal catalyst at and near the first end face is larger than at and near the second end face. The "impregnation process" is preferred due to being able to achieve comparatively easily supporting the noble metal catalyst on the cell walls according to the following steps. FIGS. 8A through 8D show an example of a cylindrical honeycomb unit 130 (evaluation sample); however, the steps are the same for a square pillar honeycomb unit or the like.

Figure 8A:
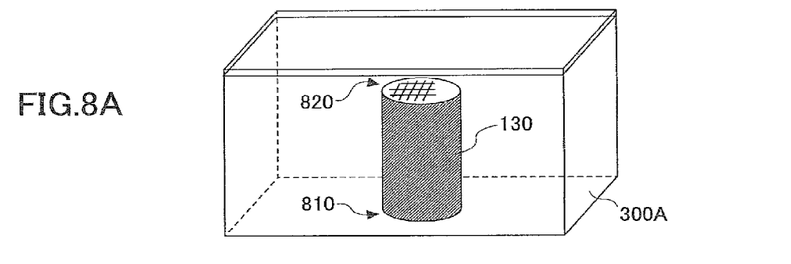
FIG. 8 schematically shows an example of a method of manufacturing a honeycomb unit in which the amount of noble metal catalyst supported on cell walls changes in a longitudinal direction of the cell walls.

(Step 1) First, as shown in FIG. 8A, the entire honeycomb unit 130 from a first end 810 to a second end 820 is immersed for a predetermined period of time in an impregnation solution at a first platinum concentration held in a tub 300A to thereby have platinum supported at all regions of the honeycomb unit 130.

Figure 8B:
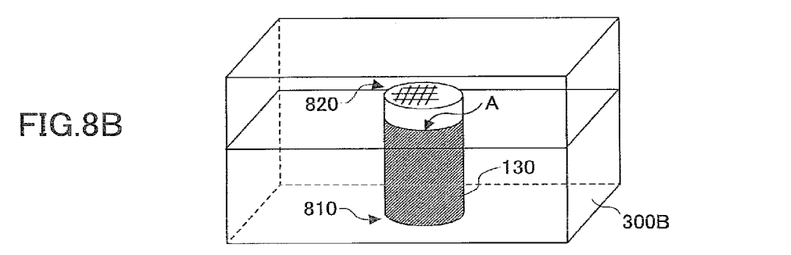

(Step 2) Next, as shown in FIG. 8B, the honeycomb unit 130, except a part ranging from the second end 820 to a position shifted a predetermined distance A from the second end 820 in the longitudinal direction, is immersed for a predetermine period of time in an impregnation solution at a second platinum concentration held in a tub 300B to thereby have more platinum supported at the immersed region. Herewith, two regions each having a different platinum supporting amount—i.e. a first region $R_1$ (ranging from the second end portion to a position A) and a second region $R_2$-$R_5$ (ranging between the position A and the first end portion)—are obtained.

Figure 8C:
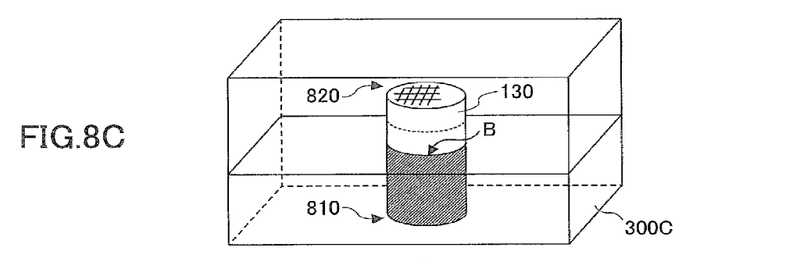

(Step 3) Then, as shown in FIG. 8C, the honeycomb unit 130, except a part ranging from the second end 820 to a predetermined position B shifted in the longitudinal direction from the second end 820, is immersed for a predetermine period of time in an impregnation solution at a third platinum concentration held in a tub 300C to thereby have more platinum supported at the immersed region. Herewith, three regions each having a different platinum supporting amount—i.e. the first region $R_1$ (ranging from the second end portion to the position A), a second region $R_2$ (ranging between the positions A and B), and a third region $R_3$-$R_5$ (ranging between the position B and the first end portion)—are obtained.

Figure 8D:
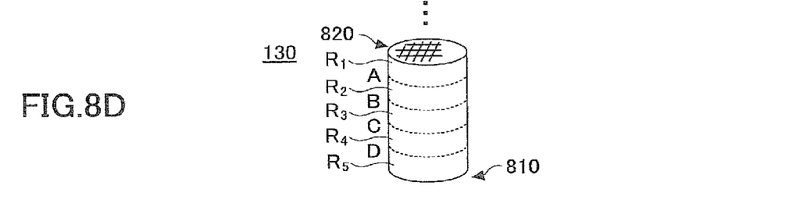

(Step 4) Subsequently, according to the same procedure, plural regions each having a predetermined platinum supporting amount—i.e. the first region $R_1$ (ranging from the second end portion to the position A), a second region $R_2$ (ranging between the positions A and B), and a third region $R_3$ (ranging between the positions B and C), a fourth region $R_4$ (ranging between the positions C and D), . . . and an $n^{th}$ region $R_n$—are obtained. Herewith, eventually it is possible to readily manufacture the honeycomb unit whose platinum supporting amount supported on the cell walls changes from the first end portion 810 toward the second end portion 820 (FIG. 8D).

It is clear that such a method allows manufacturing the honeycomb unit 130 having a platinum supporting amount more continuously changing by narrowing each space between the positions A-D.

Note that the above-mentioned steps illustrate a method of manufacturing the honeycomb unit 130 whose platinum catalyst amount supported on the cell walls changes from the first end portion 810 to the second end portion 820, in which plural impregnation solutions each having a different platinum concentration are preliminarily prepared, and the depth of immersion of the honeycomb unit 130 is changed for each impregnation solution. Alternatively, the honeycomb unit 130 whose platinum catalyst amount supported on the cell walls changes from the first end 810 to the second end 820 can be also manufactured by using a single impregnation solution and gradually changing the depth of immersion of the honeycomb unit in the solution.

Note that the supported of noble metal catalyst does not necessarily have to be carried out at the stage described above, but may be carried out at any of the following stages: when a honeycomb unit is formed; when plural honeycomb units are joined; and when a cutting process is applied on the peripheral part.

Next, a NOx storage catalyst is supported on the cell walls of the honeycomb unit 130. The NOx storage catalyst can be supported on each cell wall by impregnating the honeycomb unit in, for example, an acetic acid aqueous solution of barium carbonate.

Subsequently, an adhesive layer paste to be later formed as an adhesive layer is applied at a uniform thickness on the lateral surface of the honeycomb unit 130 that has been obtained from the previous process. Then, other honeycomb units 130 are sequentially stacked on top of the honeycomb unit 130 by interposing the adhesive layer paste. By repeating this process, a honeycomb structure of a desired size (e.g. honeycomb units 130 arranged in 4 rows and 4 columns) is manufactured. Note that the aforementioned raw material paste can be used as the adhesive layer paste.

The adhesive layer paste is not particularly limited, and examples of such are a mixture of inorganic binder and inorganic particles, a mixture of inorganic binder and inorganic fibers, and a mixture of inorganic binder, inorganic particles and inorganic fibers. Furthermore, organic binder may be added to these mixtures. The kinds of the organic binder are not particularly limited, and examples of such are one or more kinds selected from polyvinyl alcohols, methylcellulose, ethyl cellulose, carboxylmethylcellulose and the like.

The thickness of the adhesive layer joining the honeycomb units is preferably about 0.3 mm to about 2 mm. This is because, if the adhesive layer is about 0.3 mm or more in thickness, sufficient bonding strength is likely to be obtained. On the other hand, the adhesive layer with about 2 mm or less in thickness is less likely to increase pressure loss. Note that the number of honeycomb units to be joined is determined according to the size of the honeycomb structure.

Next, the honeycomb structure is heated to dry and solidify the adhesive layer paste, whereby the adhesive layer is formed and also the honeycomb units are firmly fixed to each other.

Subsequently, a cutting process is performed on the honeycomb structure 100 to form it into, for example, a cylindrical shape using a diamond cutter or the like, to thereby manufacture the honeycomb structure 100 having a desired peripheral shape.

Then, after a coat layer paste is applied on the peripheral surface (lateral surface) of the honeycomb structure 100, the coat layer paste is dried and solidified to form a coat layer. The coat layer paste is not particularly limited, and the same paste as the adhesive layer paste may or may not be used as the coat layer paste. In addition, the coat layer paste may or may not have the same compounding ratio of that of the adhesive layer paste. The thickness of the coat layer is not particularly limited.

The honeycomb structure 100 is preferably degreased after the plural honeycomb units are joined by the adhesive layer (N.B. in the case of providing the coat layer, this degreasing treatment is performed after a coat layer is formed). By the degreasing treatment, in the case where organic binders are included in the adhesive layer paste and coat layer paste, the organic binders are degreased. Degreasing conditions are appropriately determined according to the kinds and amounts of organic substances included in the pastes; however, in the usual case, degreasing is carried out at about 700° C. for about two hours.

According to the above described procedure, the honeycomb structure 100 shown in FIG. 1 can be manufactured.

[Exhaust Gas Treatment Apparatus]

Figure 9:
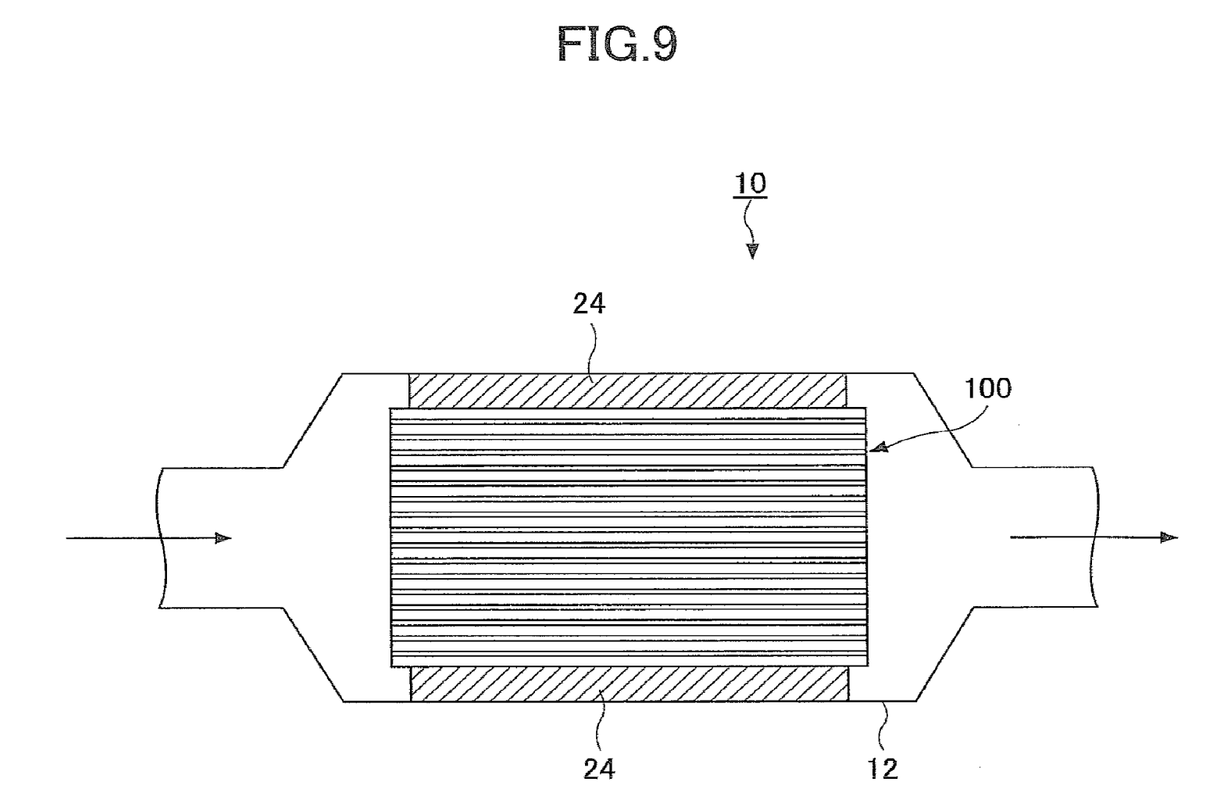
FIG. 9 schematically shows an example of an exhaust gas treatment apparatus of an embodiment of the present invention.

The following describes an exhaust gas treatment apparatus of an embodiment of the present invention with reference to FIG. 9.

An exhaust gas treatment apparatus 10 of an embodiment of the present invention has the foregoing honeycomb structure 100 housed in a metal container (shell) 12, and is placed in a passage of the exhaust gases.

More specifically, the honeycomb structure 100 is housed in the metal container 12 with holding sealing members 24 disposed between the honeycomb structure 100 and the metal container 12 in a manner that the holding sealing members 24 cover the lateral surface of the honeycomb structure 100. The holding sealing members 24 primarily comprise inorganic fibers.

The exhaust gas treatment apparatus 10 of the embodiment of the present invention has the foregoing honeycomb structure 100, which is placed in the exhaust gas treatment apparatus 10 in a manner that its end face side having a larger supporting amount of noble metal faces the upstream side of the exhaust gas passage.

Since the honeycomb structure 100 is disposed in the exhaust gas treatment apparatus 10 as described above, the exhaust gas treatment apparatus 10 of the embodiment of the present invention requires a smaller amount of noble metal catalyst supported on the honeycomb structure 100 compared to a conventional honeycomb structure exhibiting the same treatment efficiency as the honeycomb structure 100 of the embodiment of the present invention. Also, the exhaust gas treatment apparatus 10 of the embodiment of the present invention is likely to have a higher NOx treatment efficiency compared to a conventional exhaust gas treatment apparatus with a honeycomb structure having the same amount of noble metal catalyst as the honeycomb structure 100 of the embodiment of the present invention.

EXAMPLES

Next are described examples according to the embodiment of the present invention.

Example 1

First, 2250 parts by weight of γ-alumina particles (average particle diameter 2 μm), 680 parts by weight of alumina fibers (average fiber diameter 6 μm, average fiber length 100 μm), and 2600 parts by weight of alumina sol (solids content 30 wt %) were mixed together. To the resultant mixture, 320 parts by weight of methylcellulose as an organic binder, as well as small amounts of plasticizer, surfactant and lubricant agent were added, and then further mixed and kneaded to obtain a mixed composition. Subsequently, extrusion molding was performed by an extrusion molding machine using the mixed composition to thereby obtain a raw molded body.

Next, the raw molded body was sufficiently dried using a microwave drying apparatus and a hot air drying apparatus, and then subjected to a degreasing process at 400° C. for two hours. The raw molded body was subsequently fired at 700° C. for two hours to thereby obtain a porous square pillar honeycomb unit (Height 35 mm×Width 35 mm×Length 150 mm). The cell density of the porous honeycomb unit was 93 cells/cm$^2$ and the cell wall was 0.2 mm in thickness.

Then, the porous honeycomb unit was cut to be 50 mm in length using a diamond cutter. Using the diamond cutter, a cutting process was further performed on the cut porous honeycomb unit along the axis direction to obtain a cylindrical honeycomb unit (Diameter 30 mm×Length 50 mm) to be used as an evaluation sample.

Next, platinum was applied on the cell walls of the cylindrical honeycomb unit (evaluation sample) by an impregnation process, like one described in reference to FIG. 8. In the impregnation process, three impregnation solutions (dinitrodiamine platinum nitric acid solution) each having a different platinum concentration were used. Finally, the honeycomb unit had three kinds of supporting regions $R_1$-$R_5$ ($R_1$, $R_2$=$R_3$, $R_4$=$R_5$), as shown in FIG. 8D. The platinum supporting amounts for respective regions are shown in Table 1.

TABLE 1

| | Pt Supporting Amount (g/L) | |
|---|---|---|
| Region | | Region |

|  | 1 ($R_1$) second end portion-10 mm | Region 2 ($R_2$) 10-20 mm | Region 3 ($R_3$) 20-30 mm | Region 4 ($R_4$) 30-40 mm | 5 ($R_5$) 40 mm-first end portion | NOx Conversion Rate (%) | | |
|---|---|---|---|---|---|---|---|---|
|  |  |  |  |  |  | 200° C. | 300° C. | 400° C. |
| Ex. 1 | 1.0 | 2.0 | 2.0 | 5.0 | 5.0 | 82 | 92 | 84 |
| Ex. 2 | 1.0 | 1.0 | 2.0 | 4.0 | 7.0 | 80 | 90 | 83 |
| Ex. 3 | 2.0 | 2.5 | 3.0 | 3.5 | 4.0 | 80 | 89 | 82 |
| Ex. 4 | 1.0 | 2.0 | 3.0 | 4.0 | 5.0 | 81 | 90 | 82 |
| Ex. 5 | 1.0 | 2.0 | 3.0 | 3.0 | 6.0 | 82 | 92 | 84 |
| Comp. Ex. 1 | 3.0 | 3.0 | 3.0 | 3.0 | 3.0 | 68 | 84 | 78 |

Subsequently, the entire cylindrical honeycomb unit (evaluation sample) was impregnated in an acetic acid aqueous solution of barium carbonate and potassium carbonate, and then held at 600° C. for one hour. By this treatment, a NOx storage catalyst comprising a mixture of barium carbonate and potassium carbonate (equimolar ratio) was applied on each cell wall. The weight of the NOx storage catalyst per unit volume of the cylindrical honeycomb unit (evaluation sample) was 0.2 mol/L.

Example 2

Next, a honeycomb unit (evaluation sample) of Example 2 was manufactured by the same method as Example 1. Note however that Example 2 differs from Example 1 in that four impregnation solutions each having a different platinum concentration were used, whereby the honeycomb unit had four kinds of supporting regions ($R_1=R_2$, $R_3$, $R_4$, $R_5$). The platinum supporting amounts for the four regions are shown in Table 1. Other manufacturing conditions were the same as Example 1.

Example 3

Next, a honeycomb unit (evaluation sample) of Example 3 was manufactured by the same method as Example 1. Note however that Example 3 differs from Example 1 in that five impregnation solutions each having a different platinum concentration were used, whereby the honeycomb unit had five kinds of supporting regions. The platinum supporting amounts for the five regions are shown in Table 1. Other manufacturing conditions were the same as Example 1.

Example 4

Next, a honeycomb unit (evaluation sample) of Example 4 was manufactured by the same method as Example 1. Note however that Example 4 differs from Example 1 in that four impregnation solutions each having a different platinum concentration were used, whereby the honeycomb unit had four kinds of supporting regions. The platinum supporting amounts for the four regions are shown in Table 1. Other manufacturing conditions were the same as Example 1.

Example 5

Next, a honeycomb unit (evaluation sample) of Example 5 was manufactured by the same method as Example 1. Note however that Example 5 differs from Example 1 in that four impregnation solutions each having a different platinum concentration were used, whereby the honeycomb unit had four kinds of supporting regions. The platinum supporting amounts for the four regions are shown in Table 1. Other manufacturing conditions were the same as Example 1.

Note that, in the Examples 1 through 5, the platinum supporting amount was 3.0 g/L.

Comparative Example 1

Next, a honeycomb unit (evaluation sample) of Comparative Example 1 was manufactured by the same method as Example 1. Note however that Comparative Example 1 differs from Example 1 in that a single kind of impregnation solution was used and the entire honeycomb unit was immersed in the impregnation solution at one time. Herewith, a honeycomb unit having substantially the same platinum supporting amount ($R_1=R_2=R_3=R_4=R_5$) supported on the cell walls along the longitudinal direction of the honeycomb unit was obtained (the platinum supporting amount was 3.0 g/L).

[Evaluation of NOx Treatment Performance]

Evaluation of the NOx treatment performance was carried out using honeycomb units of Examples 1-5 and Comparative Example 1 (evaluation samples) manufactured by the above-described method. The evaluation was made by conducting NOx treatment where mixed gases (stimulant gases) which simulate the exhaust gases of vehicular diesel engines during lean-burn operation and rich spike control were passed through each honeycomb unit (evaluation sample), and then measuring the amount of NO (nitric oxide) included in the stimulant gases discharged from the honeycomb unit (evaluation sample). Note that, in the measurements, the exhaust gases were introduced from the first end face side (i.e. Region $R_1$) of the honeycomb unit (evaluation sample).

Table 2 shows compositions of the gases during lean-burn operation and during rich spike control. In the evaluation test, a cycle of first introducing the lean gas into the honeycomb unit (evaluation sample) for 110 seconds, and then introducing the rich gas for 10 seconds was repeated until the NO concentration in the exhaust gases started showing little change. The space velocity (SV) was 50000/hr.

TABLE 2

|  | Gas Concentration | |
|---|---|---|
| Gas Component | Lean-Burn Operation | Rich Spike Control |
| $CO_2$ | 10 vol % | 10 vol % |
| $O_2$ | 10 vol % | — |
| NO | 150 ppm | 150 ppm |
| CO | 150 ppm | 1500 ppm |
| THC (hydrocarbon) | 200 ppm* | 2000 ppm* |
| $H_2O$ | 5 vol % | 5 vol % |
| $N_2$ | Balance | Balance |

*based on the amount of carbon

For the measurements of NO concentrations, an apparatus made by Horiba Ltd. (MEXA-7100D) was used. The NO detection limit of the apparatus is 0.1 ppm.

The test temperature (honeycomb unit (evaluation sample) and gas temperature) was one of 200° C., 300° C. and 400° C., and was maintained constant during the test.

To evaluate NOx treatment performance, a NOx conversion rate N was used. The NOx conversion rate N was calculated by the following equation:

N(%)={(NO concentration in mixed gases before being introduced into honeycomb unit−NO concentration in exhaust gases discharged from honeycomb unit)}/(NO concentration in mixed gases before being introduced into honeycomb unit)× 100   (4).

The evaluation results of the NOx treatment performance test are shown on the right-hand side of Table 1 above. These results demonstrate that the honeycomb structures according to the embodiment of the embodiment of the present invention (Examples 1-5) exhibit higher NOx conversion rates at any temperature compared to the conventional honeycomb structure (Comparative Example 1).

What is claimed is:

1. A honeycomb structure comprising:
at least one honeycomb unit having a first end face and a second end face opposite to the first end face along a longitudinal direction of the at least one honeycomb unit and comprising:
an inorganic particle;
an inorganic binder;
cell walls extending along the longitudinal direction from the first end face to the second end face to define a plurality of cells;
a NOx storage catalyst provided at the cell walls, the NOx storage catalyst being substantially uniformly disposed over an entirety of the cell walls; and
a noble metal catalyst provided at the cell walls, an amount of the noble metal catalyst provided at a vicinity of the first end face being substantially different from an amount of the noble metal catalyst provided at a vicinity of the second end face,
wherein an amount of the noble metal catalyst decreases from the vicinity of the first end face toward the vicinity of the second end face while an amount of the NOx storage catalyst is substantially uniform from the vicinity of the first end face toward the vicinity of the second end face, so that a ratio of the amount of the noble metal catalyst to the amount of the NOx storage catalyst changes from the vicinity of the first end face toward the vicinity of the second end face.

2. The honeycomb structure of claim 1, wherein the amount of the noble metal catalyst decreases linearly or stepwise.

3. The honeycomb structure of claim 1, wherein an amount of the noble metal catalyst provided at a position about 10 mm away from the first end face is about two to seven times larger than an amount of the noble metal catalyst provided at a position about 10 mm away from the second end face.

4. The honeycomb structure of claim 1, wherein the noble metal catalyst includes at least one platinum, palladium and rhodium.

5. The honeycomb structure of claim 1, wherein the inorganic particle includes at least one of alumina, ceria, zirconia, titania, silica, mullite and zeolite.

6. The honeycomb structure of claim 1, wherein the inorganic binder includes at least one of alumina sol, silica sol, titania sol, liquid glass, sepiolite and attapulgite.

7. The honeycomb structure of claim 1, wherein the at least one honeycomb unit further includes an inorganic fiber.

8. The honeycomb structure of claim 7, wherein the inorganic fiber is at least one of alumina, silica, silicon carbide, silica alumina, glass, potassium titanate and aluminum borate.

9. The honeycomb structure of claim 7, wherein the inorganic fiber is included in a range of about 3 wt % to about 50 wt % in total.

10. The honeycomb structure of claim 1, wherein the NOx storage catalyst includes an alkali metal or an alkaline earth metal.

11. The honeycomb structure of claim 10, wherein the NOx storage catalyst includes at least one of potassium, sodium, barium, calcium and magnesium.

12. The honeycomb structure of claim 1, wherein the at least one honeycomb unit comprises a plurality of honeycomb units and wherein the honeycomb structure comprises an adhesive layer joining the plurality of honeycomb units together.

13. The honeycomb structure of claim 1, wherein the honeycomb unit is formed of a single honeycomb unit.

14. The honeycomb structure of claim 1, wherein the inorganic particle is included in a range of about 30 wt % to about 90 wt %.

15. The honeycomb structure of claim 1, wherein the inorganic binder is included as solids content in a range of about 5 wt % to about 50 wt %.

16. The honeycomb structure of claim 1, wherein cell density of the honeycomb unit is in a range of about 15.5 cells/cm$^2$ to about 186 cells/cm$^2$.

17. The honeycomb structure of claim 1, wherein thickness of each of the cell walls is in a range of about 0.1 mm to about 0.4 mm.

18. An exhaust gas treatment apparatus to treat NOx included in exhaust gases, the exhaust gas treatment apparatus comprising:
a honeycomb structure comprising:
at least one honeycomb unit having an upstream end face and a downstream end face opposite to the upstream end face along a longitudinal direction of the at least one honeycomb unit, the honeycomb structure being provided so that the exhaust gases flow from the upstream end face to the downstream end face, the at least one honeycomb unit comprising:
an inorganic particle;
an inorganic binder;
cell walls extending along the longitudinal direction from the upstream end face to the downstream end face to define a plurality of cells;
a NOx storage catalyst provided at the cell walls, the NOx storage catalyst being substantially uniformly disposed over an entirety of the cell walls; and
a noble metal catalyst provided at the cell walls, an amount of the noble metal catalyst provided at a vicinity of the upstream end face being larger than an amount of the noble metal catalyst provided at a vicinity of the downstream end face,
wherein an amount of the noble metal catalyst decreases from the vicinity of the upstream end face toward the vicinity of the downstream end face while an amount of the NOx storage catalyst is substantially uniform from the vicinity of the first end face toward the vicinity of the second end face, so that a ratio of the amount of the noble metal catalyst to the amount of the NOx storage catalyst changes from the vicinity of the first end face toward the vicinity of the second end face.

19. The exhaust gas treatment apparatus of claim 18, wherein the honeycomb structure is housed in a metal container with a holding sealing member disposed between the honeycomb structure and the metal container in a manner that the holding sealing member covers a lateral surface of the honeycomb structure.

20. The exhaust gas treatment apparatus of claim 18, wherein the amount of the noble metal catalyst decreases linearly or stepwise.

21. The exhaust gas treatment apparatus of claim 18, wherein an amount of the noble metal catalyst provided at a position about 10 mm away from the upstream end face is about two to seven times larger than an amount of the noble metal catalyst provided at a position about 10 mm away from the downstream end face.

22. The exhaust gas treatment apparatus of claim 18, wherein the noble metal catalyst includes at least one of platinum, palladium and rhodium.

23. The exhaust gas treatment apparatus of claim 18, wherein the inorganic particle includes at least one of alumina, ceria, zirconia, titania, silica, mullite and zeolite.

24. The exhaust gas treatment apparatus of claim 18, wherein the inorganic binder includes at least one of alumina sol, silica sol, titania sol, liquid glass, sepiolite and attapulgite.

25. The exhaust gas treatment apparatus of claim 18, wherein the at least one honeycomb unit further includes an inorganic fiber.

26. The exhaust gas treatment apparatus of claim 25, wherein the inorganic fiber is at least one of alumina, silica, silicon carbide, silica alumina, glass, potassium titanate and aluminum borate.

27. The exhaust gas treatment apparatus of claim 25, wherein the inorganic fiber is included in a range of about 3 wt % to about 50 wt % in total.

28. The exhaust gas treatment apparatus of claim 18, wherein the NOx storage catalyst includes an alkali metal or an alkaline earth metal.

29. The exhaust gas treatment apparatus of claim 28, wherein the NOx storage catalyst includes at least one of potassium, sodium, barium, calcium and magnesium.

30. The exhaust gas treatment apparatus of claim 18, wherein the at least one honeycomb unit comprises a plurality of pillar honeycomb units and wherein the honeycomb structure comprises an adhesive layer joining the pillar honeycomb units together.

31. The exhaust gas treatment apparatus of claim 18, wherein the at least one honeycomb unit comprises a single honeycomb unit.

32. The exhaust gas treatment apparatus of claim 18, wherein the inorganic particle is included in a range of about 30 wt % to about 90 wt %.

33. The exhaust gas treatment apparatus of claim 18, wherein the inorganic binder is included as solids content in a range of about 5 wt % to about 50 wt %.

34. The exhaust gas treatment apparatus of claim 18, wherein cell density of the honeycomb unit is in a range of about 15.5 cells/cm$^2$ to about 186 cells/cm$^2$.

35. The exhaust gas treatment apparatus of claim 18, wherein thickness of each of the cell walls is in a range of about 0.1 mm to about 0.4 mm.

\* \* \* \* \*